US012781421B2

(12) United States Patent
Zaccone

(10) Patent No.: US 12,781,421 B2
(45) Date of Patent: Nov. 3, 2026

(54) EXHAUST FILTER ASSEMBLY FOR A CLOTHES DRYER

(71) Applicant: Anthony Zaccone, Debary, FL (US)

(72) Inventor: Anthony Zaccone, Debary, FL (US)

(73) Assignees: Anthony Zaccone, Debary, FL (US); Lorayn Delillo, Debary, FL (US)

( * ) Notice: Subject to any disclaimer, the term of this patent is extended or adjusted under 35 U.S.C. 154(b) by 463 days.

(21) Appl. No.: 18/612,107

(22) Filed: Mar. 21, 2024

(65) Prior Publication Data

US 2024/0318373 A1 Sep. 26, 2024

Related U.S. Application Data

(60) Provisional application No. 63/454,093, filed on Mar. 23, 2023.

(51) Int. Cl.
*D06F 58/22* (2006.01)
*B01D 46/00* (2022.01)
(Continued)

(52) U.S. Cl.
CPC ......... *D06F 58/22* (2013.01); *B01D 46/0006* (2013.01); *B01D 46/0045* (2013.01); *B01D 46/0086* (2013.01); *B01D 46/429* (2013.01); *B01D 46/442* (2013.01); *B01D 46/448* (2013.01); *D06F 34/05* (2020.02); *D06F 34/20* (2020.02); *D06F 34/26* (2020.02); *B01D 2273/30* (2013.01); *B01D 2279/35* (2013.01);
(Continued)

(58) Field of Classification Search
CPC .......... D06F 58/22; D06F 34/05; D06F 34/20; D06F 34/26; D06F 2103/32; D06F 2103/42; D06F 2105/58; B01D 46/0006; B01D 46/0045; B01D 46/0086; B01D 46/429; B01D 46/442; B01D 46/448; B01D 2273/30; B01D 2279/35
See application file for complete search history.

(56) References Cited

U.S. PATENT DOCUMENTS

| | | | |
|---|---|---|---|
| 4,395,831 | A | 8/1983 | Nielsen |
| 5,210,960 | A | 5/1993 | Larue |

(Continued)

FOREIGN PATENT DOCUMENTS

| | | | | |
|---|---|---|---|---|
| CN | 113026317 A | * | 6/2021 | ............. D06F 58/22 |
| DE | 19952751 B4 | * | 1/2009 | ............. D06F 58/22 |

*Primary Examiner* — Ngoc T Nguyen
(74) *Attorney, Agent, or Firm* — ALLEN, DYER, DOPPELT + GILCHRIST, P.A.

(57) ABSTRACT

A clothes dryer filter assembly for a clothes dryer includes a bottom portion configured to be coupled to an exhaust conduit, a center portion coupled to the bottom portion, and a top portion coupled to the center portion. The center portion is positioned between the bottom and top portions. The assembly includes a turbulence generator positioned within the bottom portion configured to generate turbulent airflow from air received from the exhaust of the clothes dryer. In addition, a lint filter is hingedly positioned within the center portion and downstream of the turbulence generator. The lint filter is configured to swing at least partially open in response to pressure from the turbulent air flow being blocked by lint trapped on the lint filter. The assembly includes an air deflector positioned within the bottom portion to direct an air flow to a side of the bottom portion.

20 Claims, 6 Drawing Sheets

(51) Int. Cl.

| | |
|---|---|
| ***B01D 46/42*** | (2006.01) |
| ***B01D 46/44*** | (2006.01) |
| ***D06F 34/05*** | (2020.01) |
| ***D06F 34/20*** | (2020.01) |
| ***D06F 34/26*** | (2020.01) |
| ***D06F 103/32*** | (2020.01) |
| ***D06F 103/42*** | (2020.01) |
| ***D06F 105/58*** | (2020.01) |

(52) U.S. Cl.
CPC ...... *D06F 2103/32* (2020.02); *D06F 2103/42* (2020.02); *D06F 2105/58* (2020.02)

(56) References Cited

U.S. PATENT DOCUMENTS

| | | | | |
|---|---|---|---|---|
| 5,675,908 | A | 10/1997 | Barnes | |
| 6,997,966 | B2 | 2/2006 | Iantorno | |
| 8,973,282 | B2 | 3/2015 | Mackay | |
| 9,840,806 | B1 | 12/2017 | Simoes | |
| 10,138,588 | B1 | 11/2018 | Foy, Jr. | |
| 2005/0160708 | A1 | 7/2005 | Iantorno | |
| 2023/0340715 | A1* | 10/2023 | Christensen | D06F 58/22 |

* cited by examiner

EXHAUST FILTER ASSEMBLY FOR A CLOTHES DRYER

RELATED APPLICATIONS

This application claims priority to U.S. Provisional Application Ser. No. 63/454,093 filed on Mar. 23, 2023, the contents of which are herein incorporated by reference in their entirety.

FIELD

The present invention relates to the field of clothes dryers, and, more particularly, to an exhaust filter assembly for a clothes dryer.

BACKGROUND

Lint filters for clothes dryers are essential components for preventing lint buildup in the dryer vent and exhaust system, which can pose several problems if not properly managed. However, lint filters themselves can also present a few challenges.

For example, some lint filters may not effectively capture all lint particles generated during the drying cycle. This can lead to lint buildup within the dryer vent and exhaust system, reducing airflow efficiency and increasing the risk of fire. Even with regular cleaning, lint filters can become clogged over time, especially if the dryer is used frequently or if the filter is damaged. A clogged lint filter can restrict airflow, causing the dryer to run less efficiently and increasing drying times.

While lint filters are designed to trap lint and debris, they require regular maintenance to remain effective. If users fail to clean the lint filter after each drying cycle, lint can accumulate and reduce the filter's ability to capture additional lint, leading to increased risk of fire and reduced dryer performance.

In addition, exhaust systems are critical for removing moisture and lint-laden air from the dryer and venting it to the outdoors. However, several problems can arise with these exhaust systems. These problems include lint, fibers, and debris from clothing accumulating within the dryer exhaust system over time. If not cleaned regularly, lint buildup can restrict airflow, reduce dryer efficiency, and pose a fire hazard. Accumulated lint is highly flammable and can ignite if exposed to high temperatures.

The exhaust duct and vent cap can become blocked by various obstructions, such as lint, bird nests, leaves, or debris. Blockages restrict airflow, cause overheating, and increase drying times. In severe cases, blocked exhaust systems can cause the dryer to malfunction or overheat, leading to potential fire hazards.

Improper installation of the exhaust duct and venting system can lead to performance issues and safety concerns. Common installation problems include using incorrect duct materials, using ducts that are too long or have too many bends, and inadequate sealing of joints and connections. Poorly sealed ducts and connections can result in air leaks and condensation buildup within the exhaust system. Moisture accumulation can lead to mold growth, wood rot, and structural damage to the surrounding areas. Leaks can also contribute to energy loss and reduced dryer efficiency.

In some cases, exhaust vents can cause backdrafting, where outdoor air is drawn back into the home through the dryer vent. This can occur if the vent termination is located near air intake vents, windows, or other openings.

Backdrafting can compromise indoor air quality and energy efficiency. Also, insufficient ventilation in the laundry room or improper vent sizing can hinder the effectiveness of the dryer exhaust system. Without proper ventilation, moisture and heat generated by the dryer may accumulate indoors, leading to humidity issues, mold growth, and discomfort.

Accordingly, there is a need in the art for an improved exhaust filter assembly for a clothes dryer that increases safety and efficiency of the clothes dryer and that is easy to maintain.

SUMMARY

A clothes dryer filter assembly for a clothes dryer is disclosed. The assembly includes a bottom portion configured to be coupled to a clothes dryer exhaust conduit, a center portion coupled to the bottom portion, and a top portion coupled to the center portion. The center portion is positioned between the bottom and top portions. In addition, the assembly includes a turbulence generator positioned within the bottom portion and configured to generate turbulent airflow from air received from the exhaust of the clothes dryer. A lint filter is hingedly positioned within the center portion and downstream of the turbulence generator. The lint filter is configured to swing at least partially open in response to pressure from the turbulent air flow being blocked by lint trapped on the lint filter.

The assembly may include an air deflector positioned within the bottom portion, where the air deflector is configured to direct an air flow to a side of the bottom portion. The assembly may also include a filter frame configured to house the lint filter, and the bottom portion may have an inspection door to access an inside of the bottom portion to visually inspect the turbulence generator. In a particular aspect, the lint filter may comprise metal or fiberglass mesh, and the turbulence generator may comprise a paddle wheel type turbulence generator or screw type wheel turbulence generator.

The assembly may include a sensor configured to detect when the lint filter is open and/or temperatures. A controller and a transmitter may be coupled to the sensor and be configured to transmit an alert signal to a server when the lint filter is open. The server may be configured to transmit an alert to a mobile device that the lint filter is open and requires maintenance.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Terms used herein to describe the invention include "laminar airflow." Laminar airflow is a term used to describe the movement of air in parallel layers or streams with minimal disruption between the layers. In a laminar flow, the air moves smoothly and predictably in a single direction, without turbulence or mixing between adjacent layers. "Turbulent airflow" is the opposite of laminar airflow. In turbulent airflow, the air moves in an irregular, chaotic manner, characterized by fluctuations in velocity and pressure. This type of airflow is characterized by swirling eddies and mixing of adjacent layers of the fluid.

Figure 1:
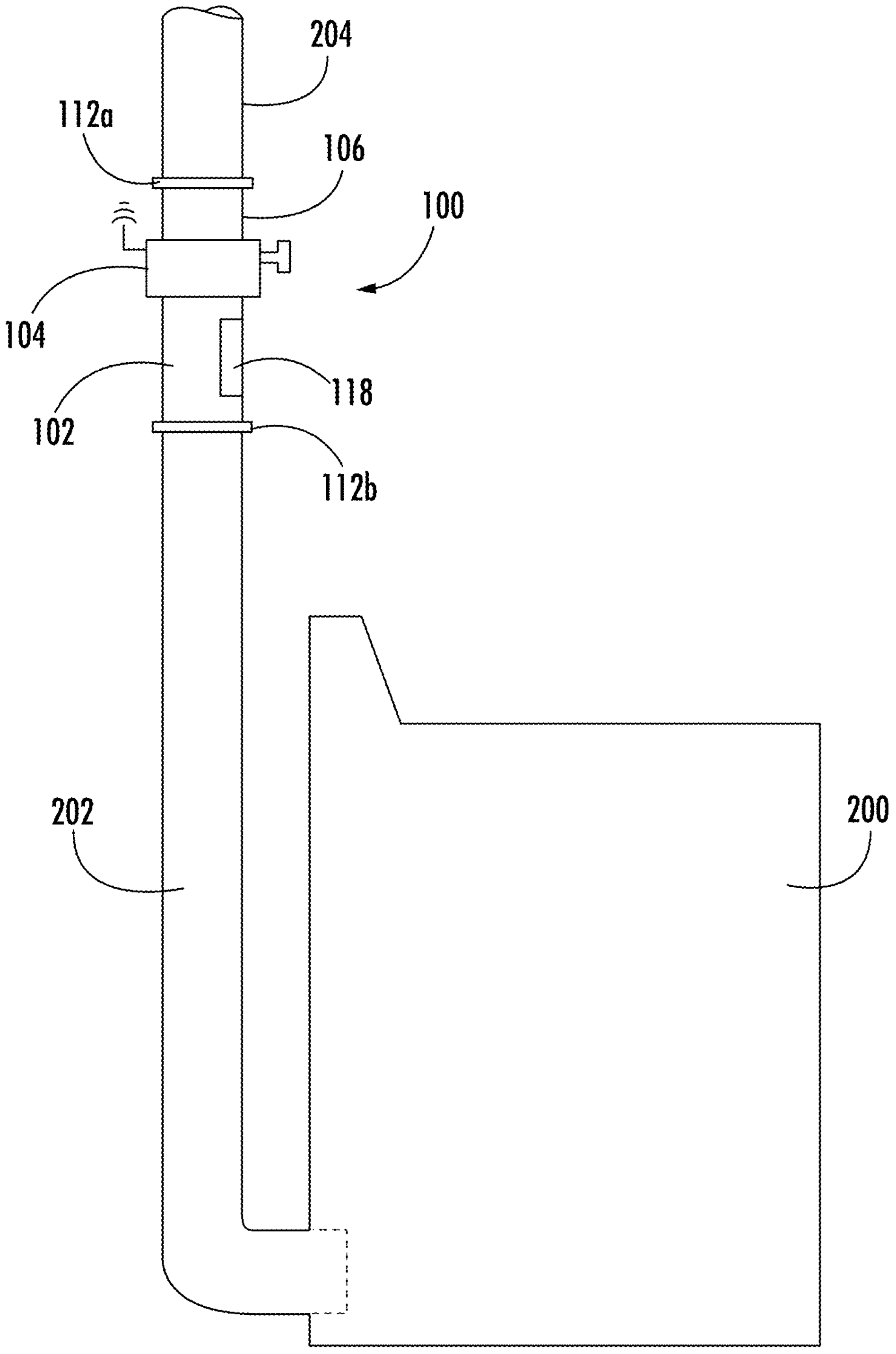
FIG. 1 is an elevational view of an exhaust filter assembly for a clothes dryer in accordance with the present disclosure and coupled to a clothes dyer.

Referring now to FIG. 1, the invention is an exhaust filter assembly for a clothes dryer and generally designated 100. The assembly 100 is configured to be coupled to exhaust ductwork of a clothes dryer. The assembly 100 includes a (lower) bottom portion 102 coupled to a lower exhaust duct 202 of a clothes dryer 200 using strap or band 112*b*. The assembly 100 also includes a center portion 104 (i.e., a housing) that is coupled to the bottom portion 102, and an (upper) top portion 106 coupled to the center portion 104. The center portion 104 is positioned between the bottom and top portions 102, 106 and also includes a lint filter 114 as explained below. The top portion 102 is also coupled to an upper exhaust duct 204 using strap or band 112*a* that vents air from the dryer to the outside.

The bottom portion 102 may also have a door 118 that allows access to an inside of the assembly 100 for inspection and maintenance. One aspect of the invention is a "safety focus" in that it reduces frequency of dryer air flow blockage and an audible warning is triggered when the filter is blocked.

The top portion 106 and the bottom portion 102 of the assembly 100 are standard cylindrical tube (typically 4 inches in diameter for residential to 8 inches in diameter for commercial) which allows for a connection to standard exhaust duct 202 from the lower exhaust opening on the typical clothes dryer 200. As those of ordinary skill in the art can appreciate, the bottom and top portions 102, 106 may comprise different shapes and sizes than disclosed herein and be within the scope of the invention.

Figure 2:
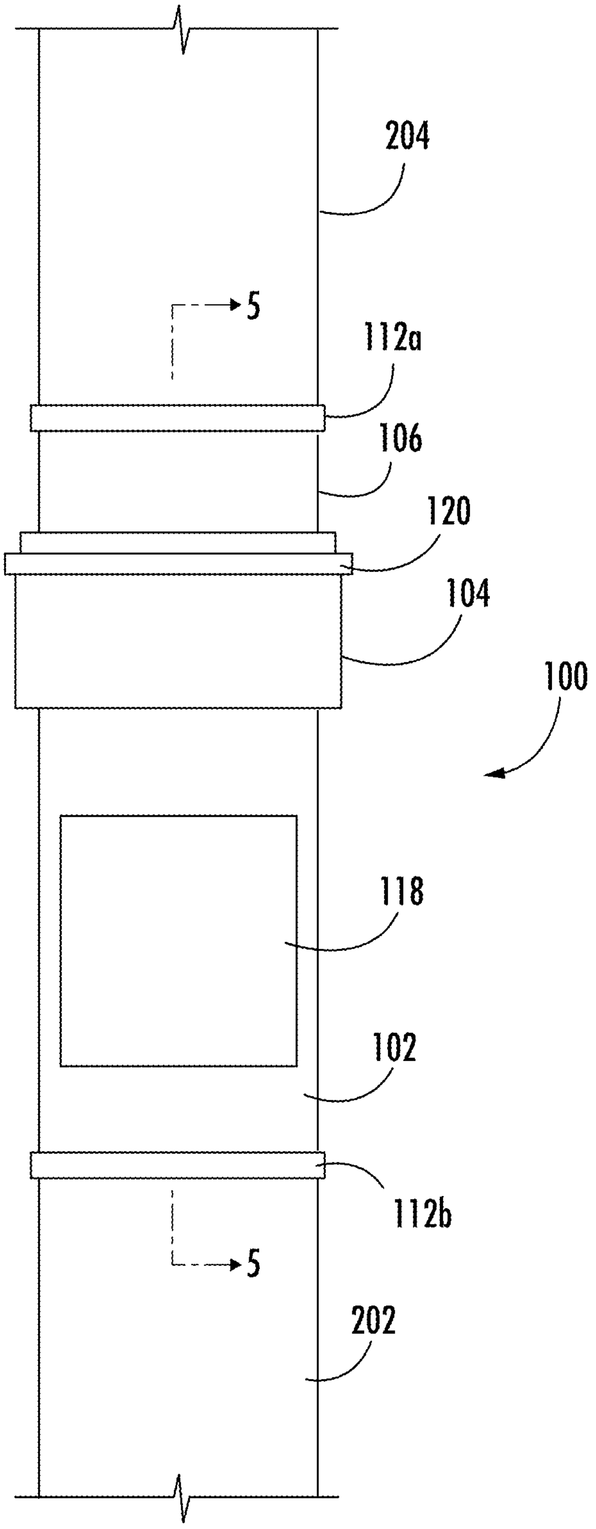
FIG. 2 is a front view of the exhaust filter assembly.

Referring now to FIG. 2, a front view of the exhaust filter assembly 100 is depicted. The inspection door 118 is configured to swing or slide open so that the user can perform maintenance on the assembly 100. As those of ordinary skill in the art can appreciate, the door 118 may be transparent, or may have a window, allowing the user to visually inspect the assembly 100 while in operation.

Figure 3:
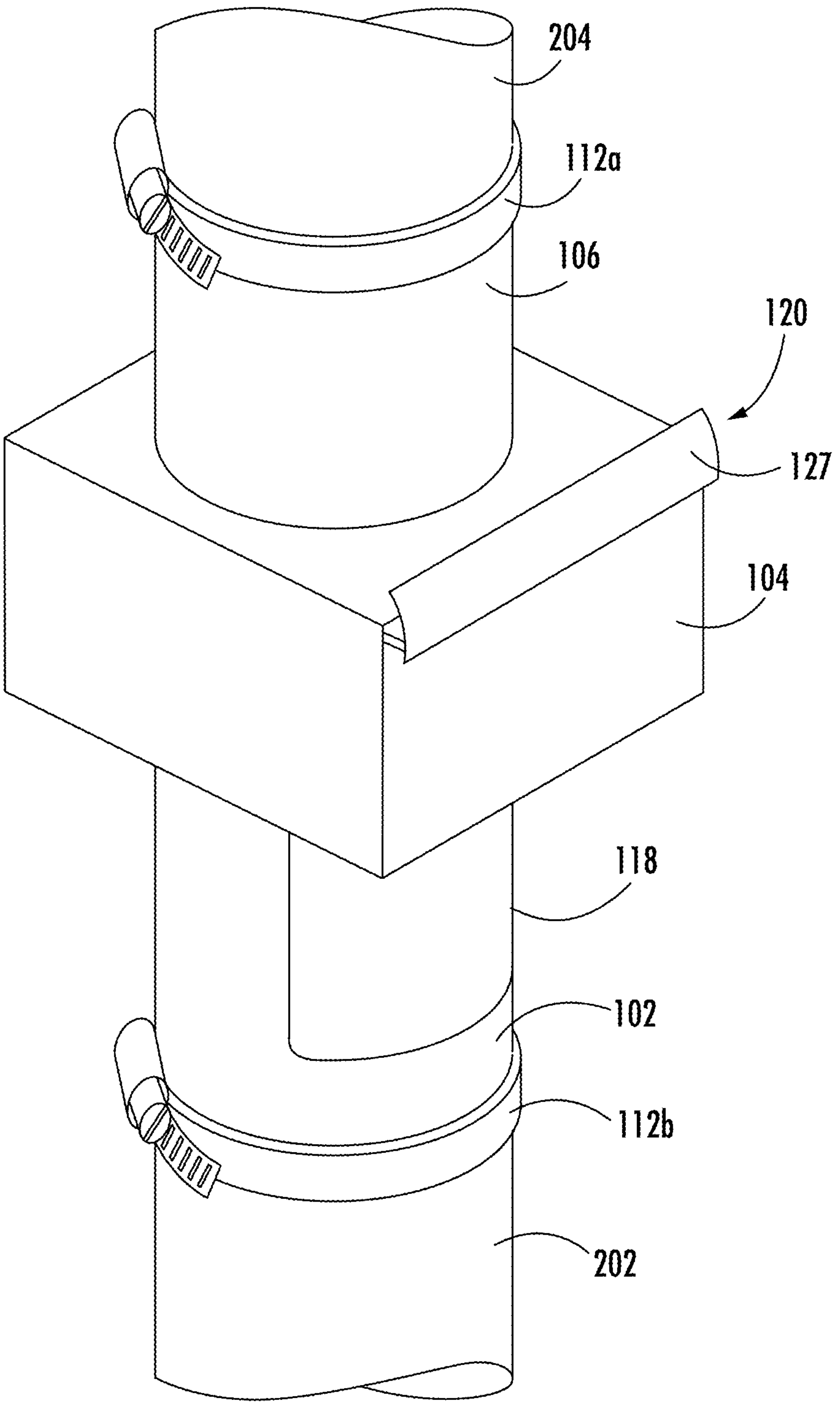
FIG. 3 is a perspective view of the exhaust filter assembly.
Figure 4:
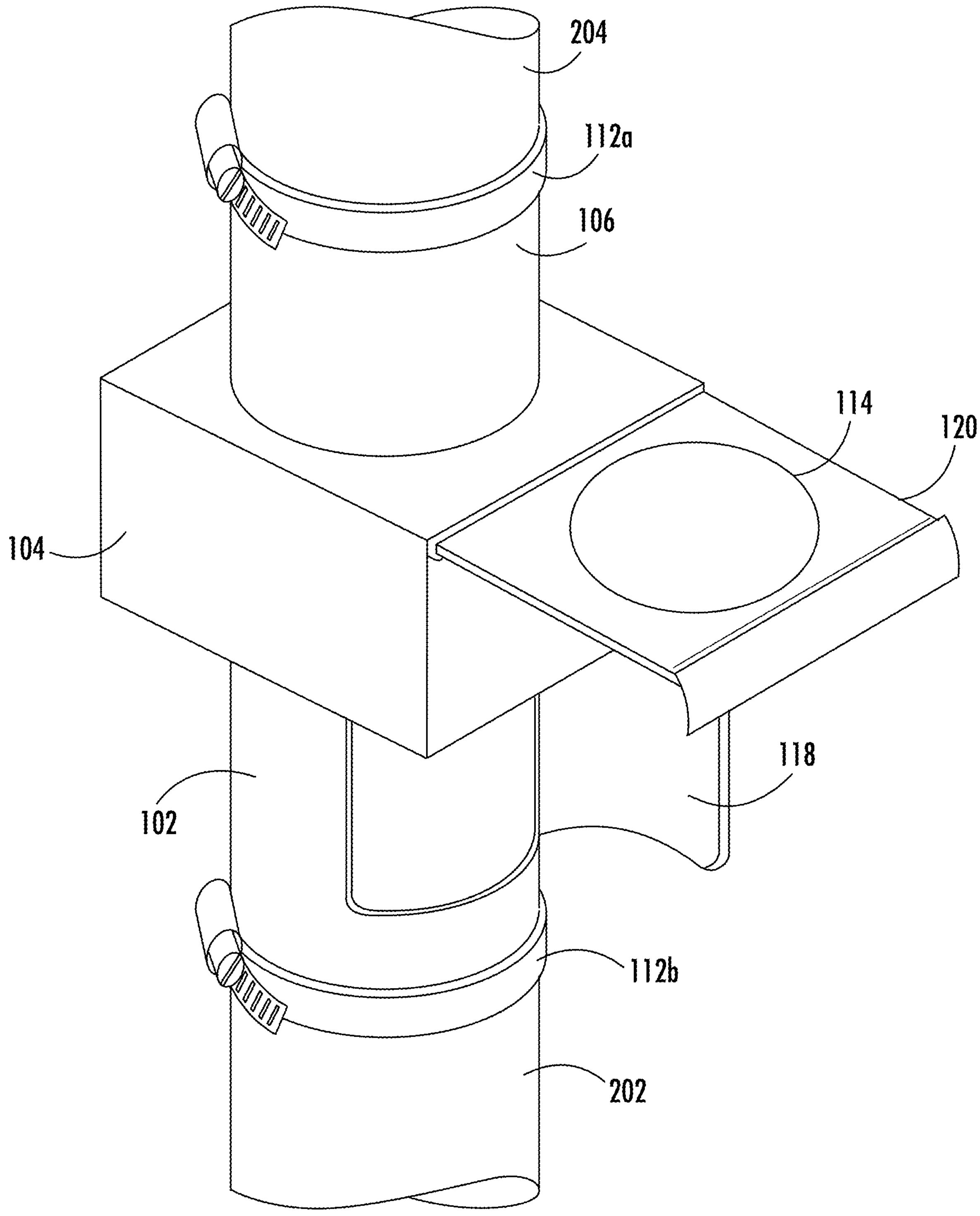
FIG. 4 is a perspective view of a filter of the exhaust filter assembly with a filter pulled out.

The bands 112*a*, 112*b* securing the top portion 106 and the bottom portion 102 to the respective ducts 204, 202 are adjustable and provide an airtight seal to the assembly 100. In a particular aspect, the bands 112*a*, 112*b* include bolts that can be turned to tighten the respective bands as shown in FIG. 3. The center portion 104 is where the filter is located and is carried by a filter frame 120. The filter frame 120 includes a hand grip 127 so that the filter frame 120 can be pulled out from the center portion 120 and the filter 114 cleaned as shown in FIG. 4.

Figure 5:
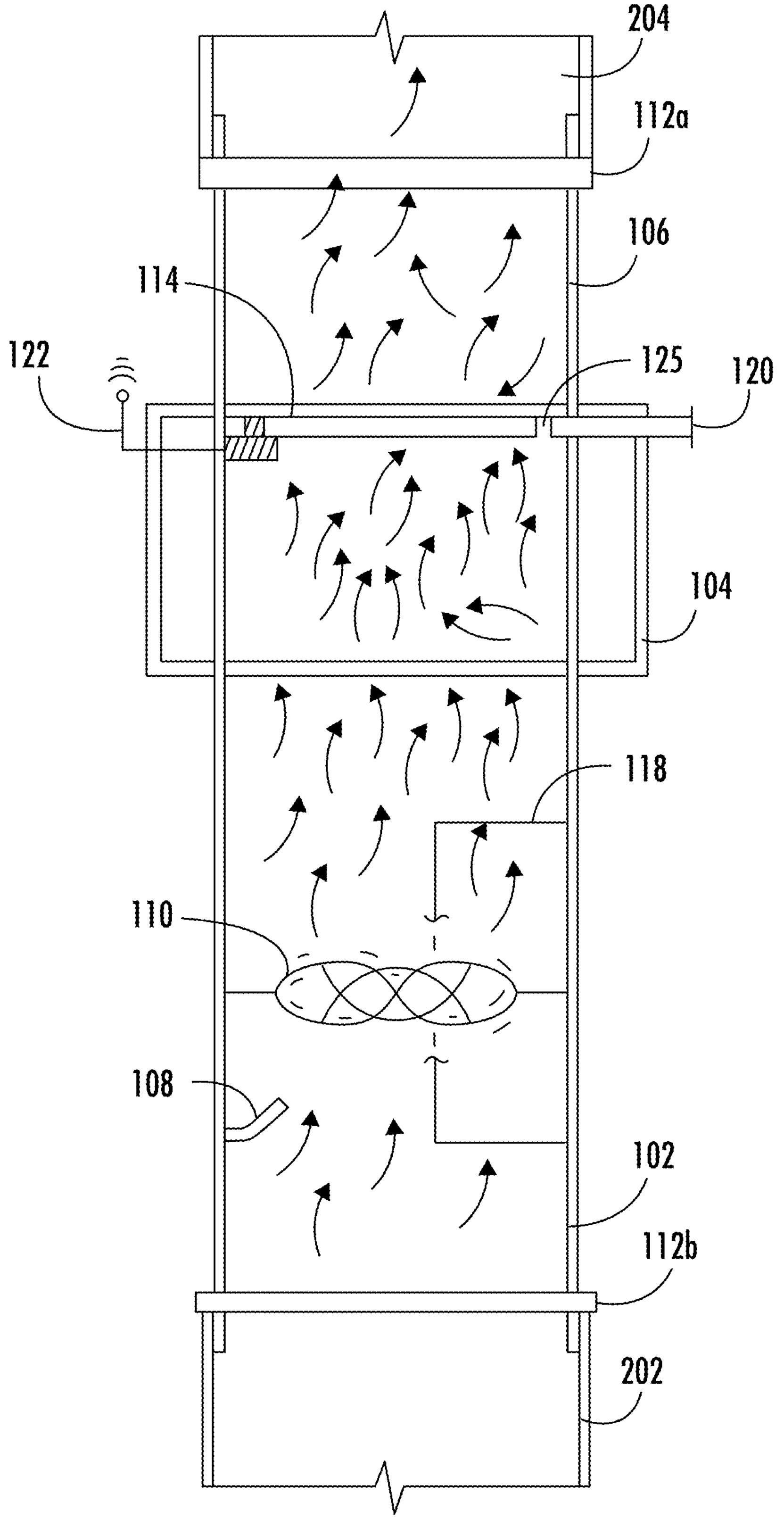
FIG. 5 is a cross sectional view taken along line 5-5 of FIG. 2.

Referring now to FIG. 5, the bottom portion 102 is the lower part of the assembly 100. The bottom portion 102 may include an air deflector device 108 which directs the incoming air to one side of the bottom portion 102. The bottom portion 102 may also include an air turbulence generator 110 that is configured to impart a specific turbulent motion to the hot dryer air before it passes through the filter 114. The generation of and action of turbulent air flow are well understood in the aerospace industry. Using this known air flow effect allows the control of lint collection on the lint filter 114 to progress from one side of the filter 114 to the side in a controlled manner. The turbulence generator 110 may be a paddle wheel type turbulence generator or screw type wheel turbulence generator, for example.

In addition, the bottom portion 102 of the assembly 100 may include an inspection door 118, as described above, that is configured to allow the user to verify or clean any lint buildup on the air deflector 108 or the turbulence generator 110.

Still referring to FIG. 5, the center portion 104 is where the removable lint filter 114 is located and may comprise a mesh material such as metal, fiberglass or other suitable material. The lint filter 114 is removably secured to a filter frame 120 to allow easy removal and cleaning of the lint material from the lint filter 114. The filter frame 120 also includes a hinge 125 or other flexible material that is configured to allow the filter frame 120 to swing open when the filter 114 is clogged as described below. This feature prevents the dangerous blockage of hot air within the ductwork.

Figure 6:
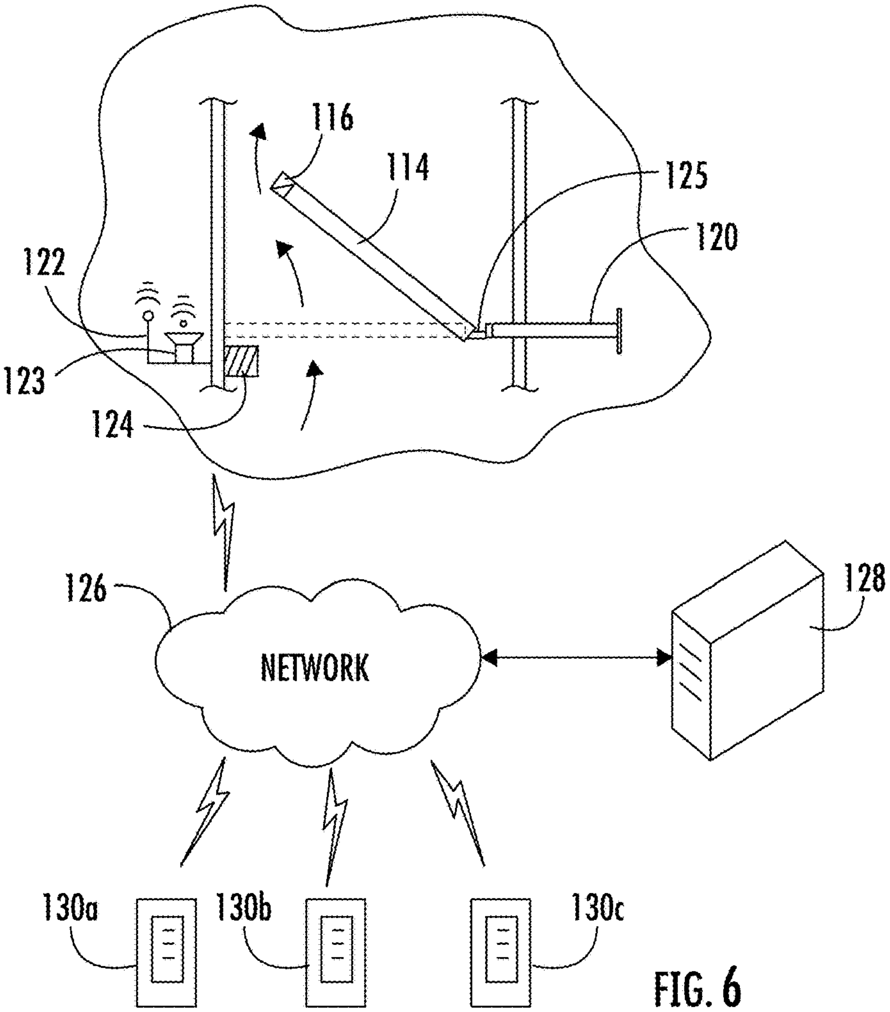
FIG. 6 is a schematic of the exhaust filter assembly in communication with a network and transmitting an alert to mobile devices that the filter is in an open position.

Referring now to FIG. 6, the center portion 104 includes a latching mechanism 116. The latching mechanism is configured for the filter frame 120 to release and swing open about the hinge 125 when a pre-determined pressure caused by the lint filter 114 being at least partially blocked by lint is exceeded. The latching mechanism 116 may implement magnetic forces or springs, for example, that are configured to keep the filter frame 120 closed until a pre-determined amount of tension is exceeded.

The center portion 104 may also include a sensing unit 124 that is triggered to generate a signal when the filter frame 120 has been released. The signal could be an audible signal or a visual signal, for example. The signal serves to notify the user that the lint filter 114 is full and must be cleaned.

The assembly 100 appears similar in outward design to a normal external dryer lint filter with at least one critical difference being the turbulence generation and the safety focused filter frame 120 that swings open and out of the dryer air flow. This critical difference makes the assembly 100 unique and more effective than a regular lint filter and much safer in that even when the lint filter 114 is clogged, it does not impede the dryer air flow and thereby reduces the risk of a fire hazard.

In operation, dryer air flow enters the assembly 100 and is directed to a turbulence generator 110 which converts the laminar air flow from the dryer 200 to a turbulent air flow directed to the lint filter 114 housed within the center portion 104. The effect of this change in air flow causes the lint filter 114 to collect lint from the air flow in a manner that fills one side of the lint filter 114 towards the other.

Accordingly, this leaves an area of the lint filter 114 open to continue to allow dryer air to move through the assembly 100 during operation. The assembly 100 and method allows more lint material to be collected when compared to a standard laminar air flow filter, which collects lint evenly across its surface and starts to restrict dryer air flow almost immediately.

In addition, the lint filter 114 is spring tensioned so that when it is covered in enough lint to block the air flow, the lint filter 114 swings upward and opens due to pressure from the dryer air flow and allows unfiltered dryer air to bypass the lint filter 114 without blocking dryer air. This reduced the risk of a fire hazard.

The sensing unit 124 comprising a sensor and microprocessor may be configured to detect the movement of the filter frame 120 when it swings open and to generate an alert. The sensor may be a Hall Effect sensor that can detect when an end 116 of the filter frame 120 swings open. The end 116 may have magnetic properties. Alternatively, the sensor may be an infrared beam or other sensing device that detects movements as those of ordinary skill in the art can appreciate.

The sensing unit 124 may be configured to generate an audio alert using speaker 123. For example, the audio alert 123 may be a beeping noise to alert a user that the filter 114 requires maintenance. In addition, the sensing unit may be coupled to a transceiver 122 to transmit a wireless alert signal to a remote server 128 via network 126. The remote server 128 processes the alert signal and transmits an alert to mobile devices 130*a*, 103*b*, 130*c*, which are correlated to a specific assembly 100. Accordingly, the user will be made aware that the filter 114 requires maintenance and that the sensing unit 124 has generated an alert.

Figure 7:
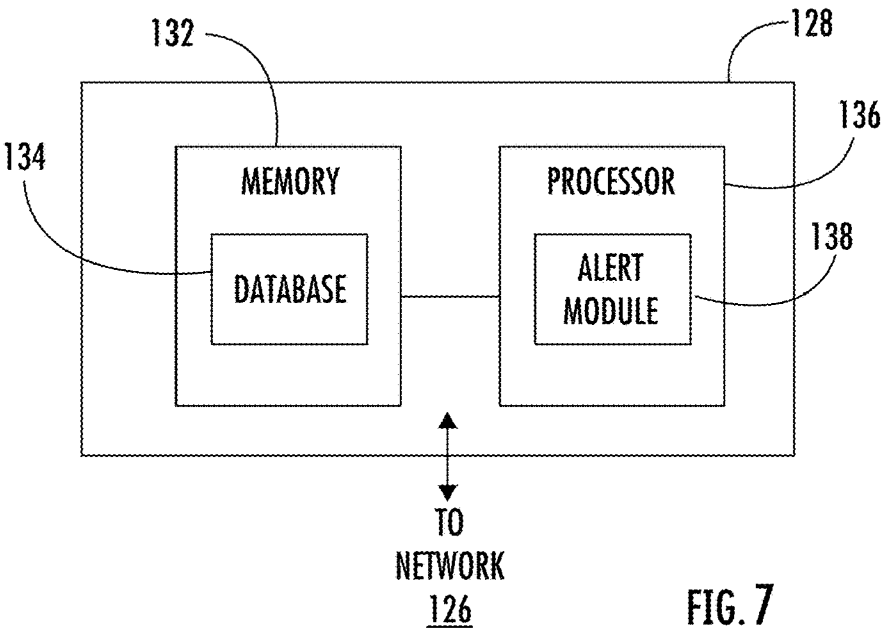
FIG. 7 is a block diagram of an exemplary computer system for implementing embodiments consistent with the present disclosure.

Referring now to FIG. 7, a block diagram of the server 128 for use with the assembly 100 is depicted. The server 128 includes a memory having a database 134. The database stores the information related to each assembly 100 and data of mobile devices associated with the respective assembly 100. The memory 132 is coupled to a processor 136. The processor 136 is configured to execute computer instructions of an alert module 138. The alert module 138 processes the alert signal in order to transmit an alert to the proper mobile device.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A clothes dryer filter assembly for a clothes dryer, the assembly comprising:
- a bottom portion configured to be coupled to a clothes dryer exhaust conduit;
- a center portion coupled to the bottom portion;
- a top portion coupled to the center portion, wherein the center portion is positioned between the bottom and top portions;
- a turbulence generator positioned within the bottom portion and configured to generate turbulent airflow to air received from the exhaust of the clothes dryer; and
- a lint filter hingedly positioned within the center portion and downstream of the turbulence generator, the lint filter configured to swing at least partially open in response to pressure from the turbulent air flow being blocked by lint trapped on the lint filter.

2. The assembly of claim 1, further comprising an air deflector positioned within the bottom portion, the air deflector configured to direct an air flow to a side of the bottom portion.

3. The assembly of claim 1, further comprising a filter frame configured to house the lint filter.

4. The assembly of claim 1, wherein the bottom portion comprises an inspection door to access an inside of the bottom portion to visually inspect the turbulence generator.

5. The assembly of claim 1, wherein the lint filter comprises metal or fiberglass mesh.

6. The assembly of claim 1, wherein the turbulence generator comprises a paddle wheel type turbulence generator or screw type wheel turbulence generator.

7. The assembly of claim 1, further comprising a sensor configured to detect at least one of a temperature and when the lint filter is open.

8. The assembly of claim 7, further comprising a controller and transmitter coupled to the sensor and configured to transmit an alert signal to a server when the lint filter is open.

9. The assembly of claim 8, wherein the server is configured to transmit an alert to a mobile device that the lint filter is open and requires maintenance.

10. A clothes dryer exhaust system, the system comprising:
- exhaust ductwork having an inlet and an outlet, the inlet configured to be coupled to a clothes dryer and the outlet configured to be coupled to an exterior vent; and
- a clothes dryer filter assembly coupled between the inlet and the outlet of the exhaust ductwork, the clothes dryer filter assembly comprising,
  - a bottom portion;
  - a center portion coupled to the bottom portion;
- a top portion coupled to the center portion, wherein the center portion is positioned between the bottom and top portions;
- a turbulence generator positioned within the bottom portion and configured to generate a turbulent airflow; and
- a lint filter hingedly positioned within the center portion and downstream of the turbulence generator, the lint filter configured to swing at least partially open in response to pressure from the turbulent airflow being blocked by lint trapped on the lint filter.

11. The system of claim 10, further comprising an air deflector positioned within the bottom portion, the air deflector configured to direct an air flow to a side of the bottom portion.

12. The system of claim 10, further comprising a filter frame configured to house the lint filter.

13. The system of claim 10, wherein the bottom portion comprises an inspection door to access an inside of the bottom portion to visually inspect the turbulence generator.

14. The system of claim 10, wherein the lint filter comprises metal or fiberglass mesh.

15. The system of claim 10, wherein the turbulence generator comprises a paddle wheel type turbulence generator or screw type wheel turbulence generator.

16. The system of claim 10, further comprising a sensor configured to detect when the lint filter is open.

17. The system of claim 16, further comprising a controller and transmitter coupled to the sensor and configured to transmit an alert signal to a server when the lint filter is open.

18. The system of claim 17, wherein the server is configured to transmit an alert to a mobile device that the lint filter is open and requires maintenance.

19. A clothes dryer filter assembly for a clothes dryer, the assembly comprising:

a housing;

a turbulence generator secured within the housing and configured to generate turbulent airflow to air received from an exhaust of a clothes dryer; and a lint filter hingedly positioned within the housing and downstream of the turbulence generator, the lint filter configured to swing at least partially open in response to pressure from the turbulent air flow being blocked by lint trapped on the lint filter.

20. The assembly of claim 19, further comprising:

a sensor configured to detect at least one of a temperature and when the lint filter is open; and a controller and transmitter coupled to the sensor and configured to transmit an alert signal when the lint filter is open.

* * * * *